United States Patent [19]
Driver

[11] 4,031,713
[45] June 28, 1977

[54] FLEXIBLE DRILL PIPE

[76] Inventor: W. B. Driver, 19 Sheridan Road, Arnold, Md. 21012

[22] Filed: Nov. 25, 1975

[21] Appl. No.: 635,136

Related U.S. Application Data

[63] Continuation-in-part of Ser. No. 465,500, April 30, 1974, abandoned.

[52] U.S. Cl. ............................ 64/2 P; 64/4; 138/120; 138/134
[51] Int. Cl.² .............................................. F16C 1/02
[58] Field of Search ............... 64/2 R, 2 P, 1 V, 3, 64/4; 138/120, 134, 129, 139

[56] References Cited

UNITED STATES PATENTS

| | | | |
|---|---|---|---|
| 832,523 | 10/1906 | Anderson | 138/120 |
| 2,441,719 | 8/1948 | Potter | 64/2 P |
| 2,655,012 | 10/1953 | McCrery | 64/2 P |
| 2,717,146 | 9/1955 | Zublin | 64/2 P |
| 3,118,159 | 1/1964 | Kollmann | 64/2 R |
| 3,405,537 | 10/1968 | Thearle | 64/2 R |
| 3,940,945 | 3/1976 | Hardmark et al. | 64/2 R |

Primary Examiner—Samuel Scott
Assistant Examiner—Randall Heald

[57] ABSTRACT

According to the invention a flexible drill pipe constructed of a closed pitch cylindrical spiral coil of wire rod with a floating core of tube sections constructed the same positioned end to end but not attached through the hollow center of the coil of wire rod to keep the coil of wire rod from collapsing under torsion loads required for a drilling operation. A thin wall hose is laid through the tube sections so drilling fluids can be pumped through the flexible drill pipe during a drilling operation.

2 Claims, 2 Drawing Figures

FLEXIBLE DRILL PIPE

This application is a continuation-in-part of my application titled Flexible Drill Pipe, filed Apr. 30, 1974 and has Ser. No. 465,500, now abandoned.

BACKGROUND OF THE INVENTION

1. Field of the Invention

This invention relates to drill pipes, shafts or rods used to bore holes in the earth and wire wound flexible hollow rods.

2. Prior Art

There have been attempts to develop a hollow flexible drill pipe before and wire wound flexible hollow pipes have been experimented with but failed because the hollow center collapsed when the pipe was put under the high torsion loads required in a drilling operation. This happens because the spring wire required to make a flexible hollow pipe is bendable and a pipe made of spring wire needs a core in which the spring wire will not bend or collapse through. A flexible pipe used to drill holes in the earth requires a hollow center so drilling fluids can be pumped through the pipe to remove drilling cuttings from the hole being drilled. There has been a long recognized need in the petroleum and mining industries for a small flexible drill pipe that can drill small angle holes or curved holes from a large diameter well or bore hole.

SUMMARY OF THE INVENTION

An object of the invention is to provide a wire wound flexible drill pipe which can drill angle holes or curved holes in earth formations.

An object of the invention is to provide a wire wound flexible drill pipe that can drill holes in earth formations while being bent or flexed around a curved pipe or other deflecting tool.

An object of the invention is to provide a flexible drill pipe constructed of a closed pitch cylindrical spiral coil of wire rod and laid through the hollow center of the coil of wire rod tube sections positioned end to end and forming a floating support structure that supports the coil of wire rod and will not let the coil of wire rod collapse under drilling torsion loads.

A further object of the invention is to provide a thin wall hose laid through the tube sections so drilling fluids can be pumped through the flexible drill pipe during a drilling operation.

DESCRIPTION OF THE DRAWINGS

In the accompanying drawings

DESCRIPTION OF THE PREFERRED EMBODIMENT

Referring to the accompanying drawings which form a part of this disclosure sections of the flexible drill pipe are shown.

Figure 1:
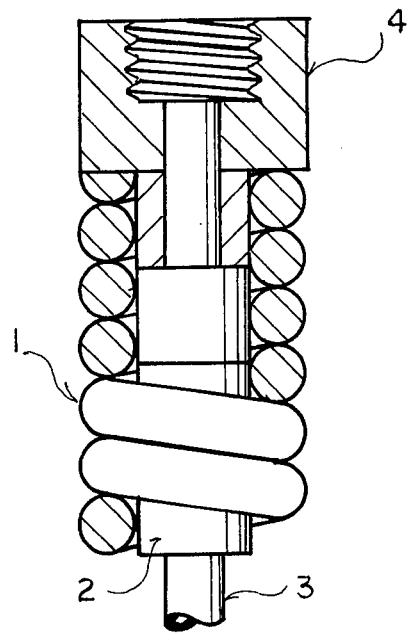
FIG. 1 is a partial cross section of one end of the flexible drill pipe. Shown is the end section and cross section of the closed pitch cylindrical coil of wire rod, a cross section of a female tool joint attached to one end portion of the wire rod, tube sections and a cross section of a tube section laid through the coil of wire rod, a section of the thin wall hose laid through the tube sections and into and secured to the female tool joint.
Figure 2:
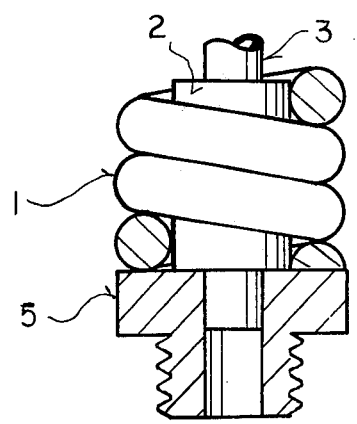
FIG. 2 is a partial cross section of the end of the flexible drill pipe opposite the end shown in FIG. 1. Shown is the end section and cross section of the closed pitch cylindrical coil of wire rod and a cross section of a male tool joint attached to the end portion of the coil of wire rod, tube sections laid through the coil of wire rod and a section of the thin wall hose that is laid through the tube sections and into and secured to the male tool joint.

In FIG. 1 and FIG. 2 a closed pitch cylindrical coil of wire rod 1 is shown. The length of coil of wire rod 1 extends the length of the flexible drill pipe except for attaching fittings which are female tool joint 4 and male tool joint 5. The coil of wire rod 1 forms the flexible drilling torsion and compression load carrying structure of the flexible drill pipe. Rod 1 can not be constructed of wire rod wound with open pitch or wire rod extended so the pitch will be open because rod 1 has to transmit drilling torsion and comression loads around curved holes being drilled or deflecting tools without a reduction of length on the inside radius of bend. Also it is well known that closed pitch coiled wire rods can transmit and carry higher torsion loads than open pitch coiled wire rods because of the direct interface between the coils of closed pitch coiled wire rods. Coil of wire rod 1 also carries all the tension loads on the flexible drill pipe.

Through the hollow center of closed pitch cylindrical coil of wire rod 1 tube sections 2 are laid the length of the cylindrical coil wire rod 1. The tube sections 2 are positioned end to end and in contact but are not attached because where the ends of the tube sections 2 contact is a flexible point so coil of wire rod 1 of the flexible drill pipe can be flexible. The tube sections 2 are made of a strong metal or other related material and their function is to keep coil of wire rod 1 from collapsing when coil of wire rod 1 is under high drilling torsion loads. All tube sections 2 are constructed the same so there will be an even distribution of flexing moments over the length of coil of wire rod 1 particularly over the length of coil of wire rod 1 extended around the radius of bend of a curved hole or deflecting tool. The overall diameter of the tube sections 2 is such to have circumferential contact with coil of wire rod 1. If greater flexibility of the flexible drill pipe is required the overall diameter of the tube sections 2 is such to have circumferential contact with coil of wire rod 1 when coil of wire rod 1 is under a partial designed torsion load. The ends of the tube sections 2 are blunt so that the floating support structure they form will not reduce its length on the inside radius of bend when operating around the radius of bend of a curved hole or deflecting tool. In FIG. 1 and FIG. 2 the fittings for the flexible drill pipe consist of a female tool joint 4 attached to one end portion of wire rod 1 or the end coil of wire rod 1 and a male tool joint 5 is attached to the other end portion of wire rod 1 or end coil of coil of wire 1. The overall diameter of female tool joint 4 and male tool joint 5 can be equal to the overall diameter of coil of wire rod 1 so the diameter of the holes drilled using the flexible drill pipe will be a mininum in respect to the overall diameter of coil of wire rod 1. This way holes drilled by the flexible drill pipe can act as a casing to the flexible drill pipe and help eliminate undesirable flexing of the flexible drill pipe during a drilling operation. The thin wall hose 3 is laid through the tube sections 2 and into and secured to female tool joint 4 and male tool joint 5 so that drilling fluids can be pumped through the flexible drill pipe during a drilling operation to remove cuttings from the hole being drilled. The thin wall hose 3 is secured to female tool joint 4 and male tool joint 5 by adhesive or other means that are common to attaching hoses to fittings and are not shown. The axial length of the tube sections 2 is not less than the diameter of wire rod 1 so tube sections 2 will support wire rod 1 and the axial length of the tube sections 2 will not be longer than twice the diameter of wire rod 1 so that as many coils as possible can be flexed in the coil of wire rod 1.

I claim:

1. A flexible drill pipe for operating around the radius of bend of a curved hole or deflecting tool and the flexible drill pipe comprises, a closed pitch cylindrical spiral coil of wire rod, a female tool joint rigidly secured to one end portion of said rod, a male tool joint rigidly secured to the opposite end portion of said rod, a plurality of tube sections positioned end to end in contact within said coil or wire rod and having complete circumferential contact with said rod, said tube sections extending the full length of said coil of wire rod and contacting said tool joints at each end of said rod, flexible structure formed by said tube sections supports said coil or wire rod under high torsion loads and keeps said coil of wire rod from collapsing, all said tube sections constructed the same permitting an even distribution of flexing moments over the length of said coil of wire rod, said tube sections each having an axial length not more than twice the diameter of said rod and not less than the diameter of said rod for support and maximum flexibility of said coil of wire rod, ends of said tube sections being blunt so the length around the inside radius of bend of the said structure formed by said tube sections will not be reduced when bent or flexed, a thin wall hose extending through said tube sections and secured to said joints at its opposite ends permit drilling fluids to be pumped through said drill pipe.

2. In claim 1, for added flexibility, diameter of said tube sections being such that said tube sections having complete circumferential contact with said rod when said rod being under partial torsion load.

* * * * *